United States Patent [19]

Littrell

[11] 4,300,921
[45] Nov. 17, 1981

[54] APPARATUS AND METHOD FOR REMOVING FINELY DIVIDED SOLIDS FROM GASES

[75] Inventor: Denis G. Littrell, Anchorage, Ky.

[73] Assignee: Rexnord, Inc., Milwaukee, Wis.

[21] Appl. No.: 127,197

[22] Filed: Mar. 4, 1980

[51] Int. Cl.³ .................................. B01D 46/04
[52] U.S. Cl. ............................. 55/96; 55/99; 55/273; 55/300; 55/432; 55/479; 55/350; 55/484; 55/502; 55/291
[58] Field of Search ............... 55/96, 79, 99, 282, 55/302, 300, 271–273, 432, 350, 474, 479, 484, 291, 502; 34/174

[56] References Cited

U.S. PATENT DOCUMENTS

| | | |
|---|---|---|
| 171,502 | 12/1875 | Catchpole et al. . |
| 182,328 | 9/1876 | Poole . |
| 413,416 | 10/1889 | Phillips et al. . |
| 1,013,266 | 1/1912 | Asplund . |
| 1,549,680 | 8/1925 | Nordstrom ........................ 55/282 |
| 1,648,716 | 12/1925 | Berrisford . |
| 1,668,244 | 2/1926 | Harris . |
| 2,493,356 | 1/1950 | Mercier et al. ................... 55/282 |
| 3,087,618 | 4/1959 | Musschoot et al. . |
| 3,356,213 | 7/1965 | Weber . |
| 3,800,508 | 4/1974 | Zenz . |
| 3,847,094 | 11/1974 | Taeymans et al. . |
| 3,868,237 | 2/1975 | Berz .................................. 55/283 |
| 3,871,846 | 3/1975 | Berz et al. ......................... 55/512 |
| 3,899,416 | 8/1975 | Schwartz et al. . |
| 3,917,458 | 11/1975 | Polak . |
| 3,920,427 | 11/1975 | Lachnit ............................. 55/479 |
| 3,964,889 | 6/1976 | Lachnit . |
| 4,004,897 | 1/1977 | Squires . |
| 4,017,278 | 4/1977 | Reese ................................. 55/96 |
| 4,023,939 | 5/1977 | Juntgen ............................. 55/79 |
| 4,033,117 | 7/1977 | Smith . |
| 4,035,170 | 7/1977 | Lear, Jr. et al. . |
| 4,042,353 | 8/1977 | Warda et al. . |
| 4,083,701 | 4/1978 | Noack . |
| 4,126,435 | 11/1978 | Reese . |

FOREIGN PATENT DOCUMENTS

| | | | |
|---|---|---|---|
| 704568 | 2/1931 | France ........................... 55/474 |
| 153263 | 4/1921 | United Kingdom ............ 55/282 |
| 216675 | 6/1924 | United Kingdom ............ 55/479 |
| 754214 | 8/1956 | United Kingdom ............ 55/79 |

*Primary Examiner*—Bernard Nozick
*Attorney, Agent, or Firm*—Schwartz, Jeffery, Schwaab, Mack, Blumenthal & Koch

[57] ABSTRACT

Disclosed is a granular bed dust collector system in which the granular bed of a filter panel is rejuvenated when necessary by interrupting the gas flow through the panel, withdrawing the granular filter media from the panel, dedusting the filter media to dislodge and separate the collected dust from the granules, returning the granular filter media to the filter panel, and reestablishing the gas flow through the panel. One filter panel or a plurality connected in parallel can be serviced, preferably sequentially, by a dedusting unit comprised of a plurality of surfaces which are inclined with respect to the vertical and are spaced both vertically and horizontally so that the filter media cascades from one surface to the other while the dust falls in between.

38 Claims, 5 Drawing Figures

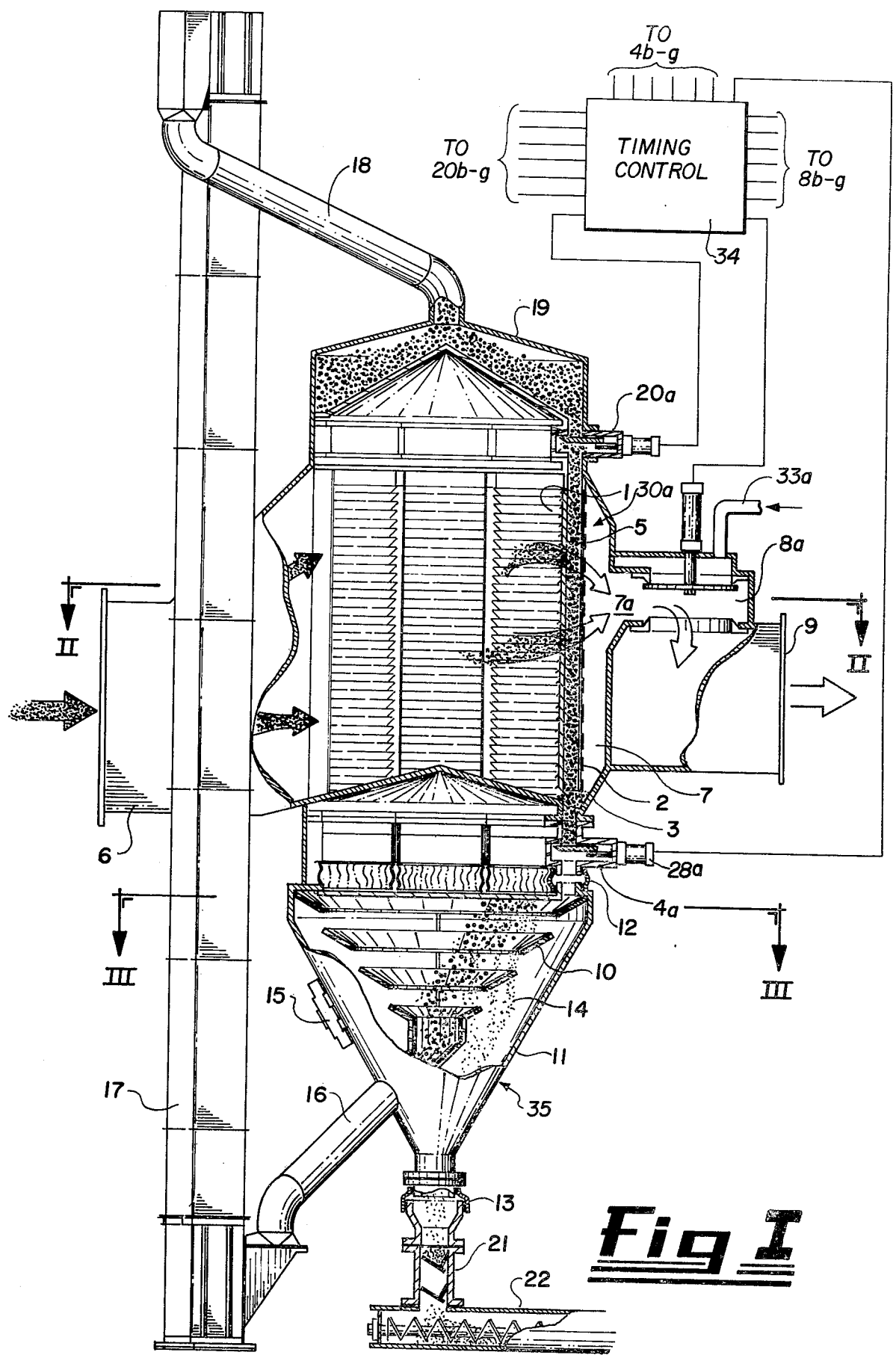
Fig I

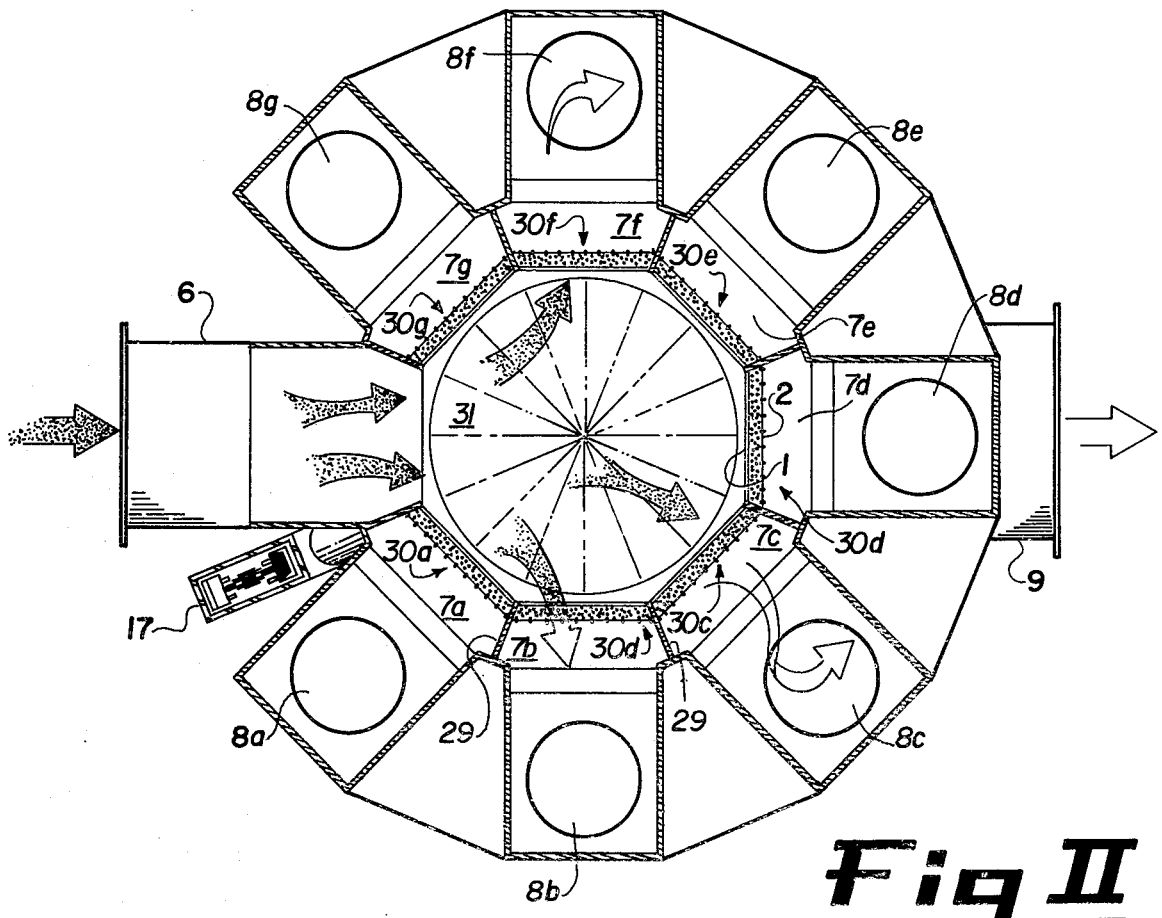
Fig II
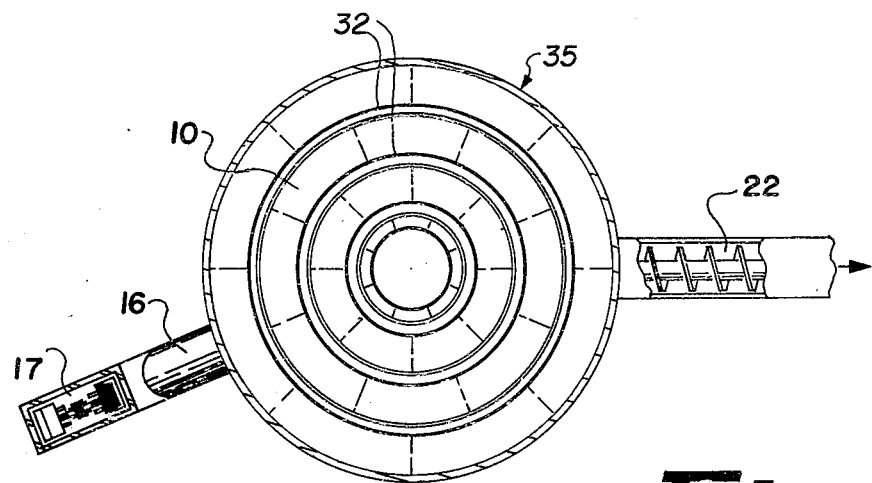
Fig III

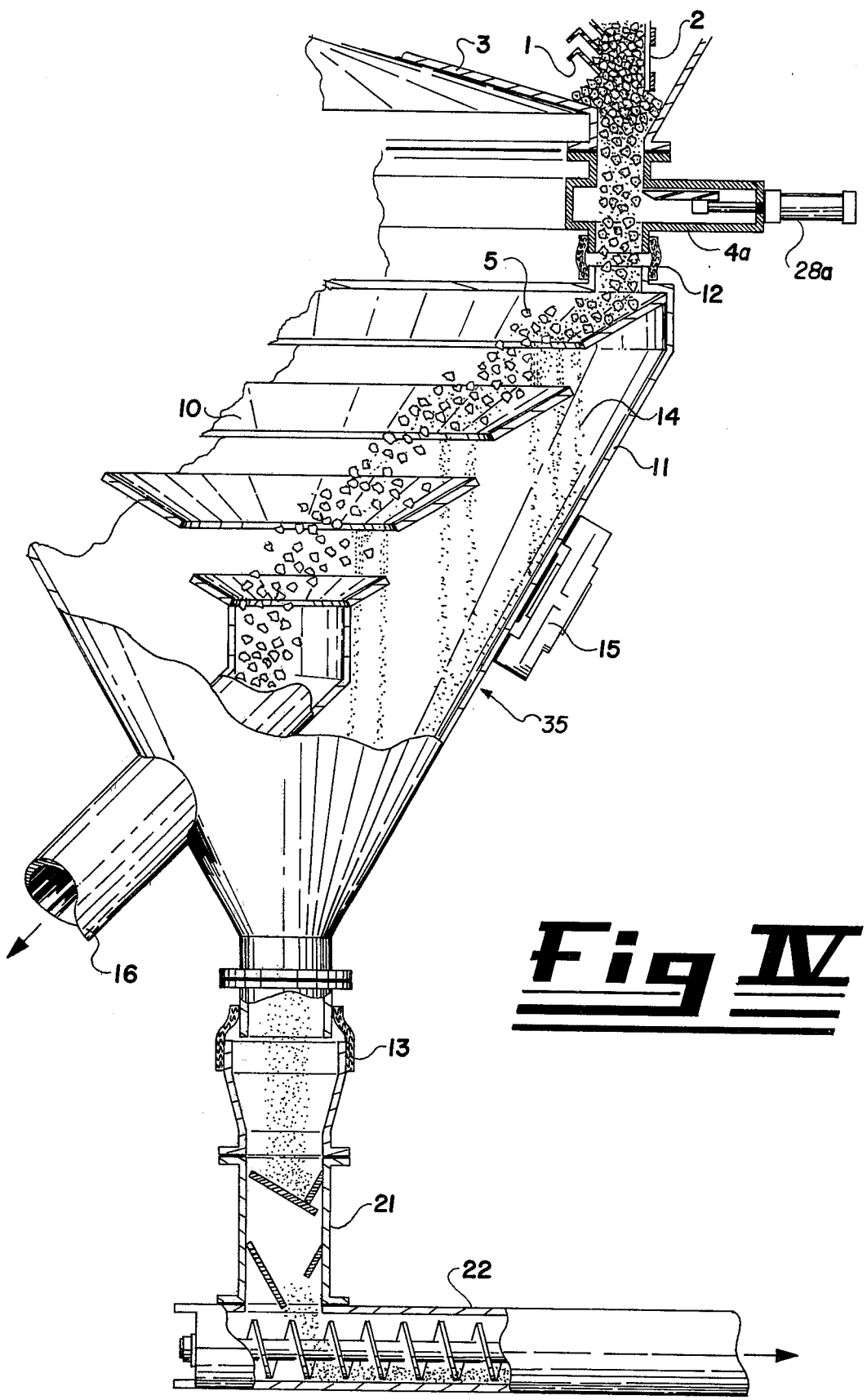
Fig IV

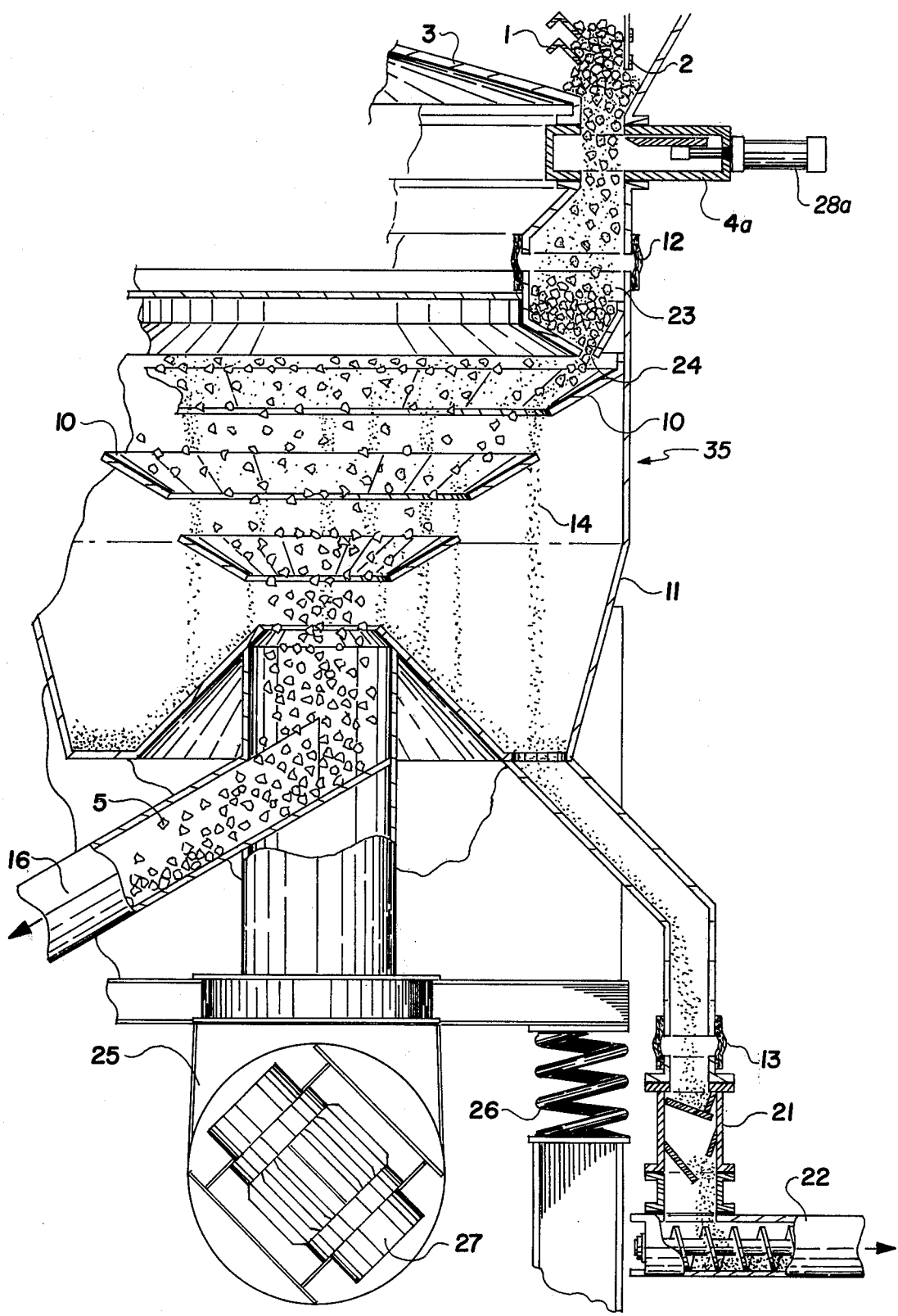
Fig V

APPARATUS AND METHOD FOR REMOVING FINELY DIVIDED SOLIDS FROM GASES

BACKGROUND OF THE INVENTION

The present invention relates to a granular bed filtering arrangement and more particularly to a granular bed system for filtering and collecting particulate matter of very small size from gaseous streams. The invention also pertains to a process of separating entrained particulate material from a gaseous stream.

Granular bed filters have been used extensively to collect the dust from hot process exhaust systems. One type of granular bed filter used for this purpose is exemplified by those illustrated in Berz, U.S. Pat. No. 3,868,237 and No. 3,871,846. In such a filter, the dust-contaminated exhaust gas, after flowing through a cyclone-type separator, flows downwardly through a horizontally arranged granular filter bed in which the dust is entrapped. When the bed becomes dustladen, a backflush gas is blown upwardly through the bed to dislodge the collected dust, preferably in agglomerated chunks, and carry it into the cyclone for separation from the backflush gas. The backflush gas goes into the inlet, contaminated gas stream and thence to another granular bed filter of the system for cleaning Granular bed filters of this type which employ a stationary bed and a backflushing step operate very satisfactorily for many applications, for example, in cleaning exhaust gas streams from cement manufacturing plants. However, this type of system also possesses certain inherent disadvantages which limit its application. For example, such a system is generally not suitable for separation of sub-micron particle sizes, since this requires use of a granular material having mesh sizes which are too fine to permit effective backflushing, i.e., the fine bed particles will be blown out of the bed during backflushing. It is impractical to simply increase the thickness of the bed, since this increases the pressure drop across the bed and results in an unacceptable increase in the operating costs for the system. Another limitation of this type of system is that it is capable of removing from the system only the dust which is agglomerated into chunks large enough to be separated by the cyclone. The non-agglomerated dust tends to simply build up in the system and ultimately requires some measure to remove it.

Another commercially available granular bed filter, e.g., of the type shown in U.S. Pat. No. 4,017,278 to Reese, employs a vertically contained granular bed which is generally continuously moving. This type of system obviates the need to have separate cleaning or backflushing phases. The movement of the bed, however, is a disturbing influence which interferes with the collection of the dust in the granular bed which would otherwise occur if the entire bed were quiescent. In addition, the granules at the extreme outer edges of the filter chamber do not travel vertically downward, as does the interior of the bed, because the constant refill does not allow a drain space between the louvers of the filter walls. External dedusting of the granular material removes the separated dust from the system.

Thus, there exists a need for a granular bed filter system which is capable of effectively removing sub-micron size particles and which is economical with respect to both initial installation and operation. Granular bed filters are, in general, energy inefficient.

There also exists a need for a granular bed filter system having an improved means for dedusting the spent granular filter media. Conventional methods, such as backflushing and the use of vibrating screens, involve disadvantages such as plugging, wear and high energy consumption.

SUMMARY OF THE INVENTION

It is therefore an object of the present invention to provide an improved granular bed filter arrangement.

It is also an object of the invention to provide an improved granular bed filter arrangement which can be used to economically separate sub-micron particle sizes from a contaminated gas stream.

Another object of the invention resides in providing an improved granular bed filter arrangement which is economical to produce and to operate and which has low energy requirements.

A particular object of the invention is to provide an improved granular bed filter arrangement having an improved system for dedusting the granular media.

Still another object of the invention resides in providing an improved process for separating particulate contaminants from a gaseous stream, especially particulate contaminants of very fine particle sizes.

In accomplishing the foregoing objects, there has been provided in accordance with one aspect of the present invention a device for removing particulate material entrained in a gaseous stream, comprising a generally gas-tight containment vessel; a gas inlet for introducing the particulate material-containing gaseous stream into the central portion of the vessel; a plurality of generally vertically oriented filter panels arranged circumferentially about the central portion of the vessel, these filter panels being adapted for receiving a bed of granular material as a filter media; a separate clean gas outlet associated with each of the filter panels, thereby defining a plurality of independent gas flow paths from the central portion of the vessel through each of the respective filter panels to the clean gas outlet associated with each of the filter panels, whereby particulate material contained in the gas flowing through each filter panel will become trapped in the granular filter media; means for selectively closing each of the clean gas outlets to temporarily decrease the number of independent gas flow paths; means located in the upper portion of the vessel for selectively supplying granular filter media to each of the filter panels; means for selectively emptying each of the filter panels of granular filter media; means, centrally positioned beneath the vessel, for separating trapped particulate material from the granular filter media emptied from the filter panels, this separating means cooperating with each of the filter panels to receive granular filter media selectively emptied therefrom; and means for conveying separated granular filter media from the separating means to the supplying means in the upper portion of the vessel. Preferably, the separating means comprises a plurality of surfaces, preferably substantially concentrically arranged, inverted truncated conical plates, positioned below the discharge point of the means for emptying each of the filter panels of granular filter media. The surfaces are sufficiently hard that the granular filter media will bounce upon impact with the surfaces due to the force of gravity. The surfaces are inclined with respect to the vertical and are spaced from one another both vertically and horizontally in such a way that granular filter media discharged thereon will cascade downwardly from surface to surface whereas particulate material accompanying the granular filter media will fall into the horizontal spaces between the surfaces.

In accordance with another aspect of the present invention, there has also been provided a device for removing particulate material entrained in a gaseous stream, comprising a vessel having an inlet for particulate material-contaminated gas and an outlet for clean gas; at least one filter bed of granular filter media positioned in the vessel between the inlet and the outlet to define a gas flow path from the inlet through the filter bed to the outlet; means for removing the granular filter media from the filter bed; means associated with the vessel for separating particulate material filtered from the gaseous stream from the granular filter media removed from the filter bed. The separating means comprise a plurality of surfaces positioned below the discharge point of the means for removing the granular filter media from the filter bed. The surfaces are sufficiently hard that the granular filter media will bounce upon impact with the surfaces due to the force of gravity, and the surfaces are inclined with respect to the vertical and are spaced from one another both vertically and horizontally in such a way that granular filter media discharged thereon will cascade downwardly from surface to surface whereas particulate material accompanying the granular filter media will fall into the horizontal spaces between the surfaces. Preferably, the horizontal spacing is greater between pairs of the surfaces near the bottom than between pairs of the surfaces near the top. Most preferably, the surfaces comprise a plurality of metal plates which are arranged as inverted truncated conical plates, and the separating means further comprise an inverted-conical housing member surrounding the plates and being substantially of the same diameter as the vessel and being substantially coaxial therewith.

The present invention also provides a process for removing particulate material entrained in a gaseous stream, comprising the steps of conveying a particulate material-contaminated gas through at least a first filter bed of granular filter media, whereby the particulate material becomes trapped in the granular filter media; removing the granular filter media containing trapped particulate material from the filter bed; separating trapped particulate material from the granular filter media removed from the filter bed, the separating step comprising cascading the granular filter media down a plurality of surfaces which are sufficiently hard that the granular filter media will bounce upon impact with the surfaces due to the force of gravity, and which surfaces are inclined with respect to the vertical and are spaced from one another both vertically and horizontally in such a way that granular filter media discharged thereon will cascade downwardly from surface to surface whereas particulate material accompanying the granular filter media will fall into the horizontal spaces between the surfaces; collecting the separated granular filter media; and returning the collected granular filter media to the filter bed.

Preferably, the process comprises the steps of conveying the contaminated gas also through at least one second filter bed of granular filter media connected in parallel flow with the first filter bed, interrupting the flow of gas through the first filter bed, emptying the granular filter media from the first filter bed, subjecting the emptied filter media to the separation step, returning the separated filter media to the first filter bed, reestablishing the flow of gas through the first filter bed; after flow reestablishment, interrupting the flow of gas through the second filter bed, emptying the granular filter media from the second filter bed, subjecting the emptied filter media to the separation step, returning the separated filter media to the second filter bed and reestablishing the flow of gas through the second filter bed.

Further objects, features and advantages of the present invention will become readily apparent to a person of ordinary skill in the art from the detailed description of preferred embodiments which follows, when considered together with the attached figures of drawing.

BRIEF DESCRIPTION OF THE DRAWINGS

IN THE DRAWINGS

FIG. I is a side view, with parts shown in section, of the improved granular bed filter arrangement according to the invention;

FIG. II is a horizontal section of the filter arrangement taken along the line II—II of FIG. I;

FIG. III is a horizontal section taken along the line III—III of FIG. I;

FIG. IV is a partial vertical section, partially cutaway, taken through the lower portion of the granular bed filter arrangement of FIG. I, illustrating the deduster means for separating the dust from the granular bed material; and FIG. V is a view similar to FIG. IV showing a modified form of the invention.

DETAILED DESCRIPTION OF PREFERRED EMBODIMENTS

As shown in FIGS. I and II, a filter module comprises a number of filter panels or cells 30a, 30b, 30c, etc. arranged preferably substantially vertically as the sides of a regular prism. Each panel comprises a louvered wall 1 facing toward the interior of the prism (contaminated gas side), and a second wall 2, also pervious to gas, held spaced from the first wall 1 and facing the exterior of the prism (clean gas side). The second wall 2, while being pervious to gas, must be impervious to the granular material to permit the use of fine granules and high gas flow rates. The second wall 2 is preferably a porous screen member. The assemblage of cells is mounted in a substantially gas-tight shell or housing 3. Exits at the bottom of the housing 3 below each panel are closed by slide gates 4a, 4b, etc. which may be opened or closed by operators 28 such as a linear motor or a hydraulic actuator. The gates are preferably vertically aligned with the space between the louvered wall 1 and the gas pervious wall 2. The space between the walls 1 and 2 is filled with a granular material 5, such as sand, gravel, fractured steel shot, or other granular materials or mixtures thereof conventionally used as filter media in granular filter beds. Gravel is preferably used.

Contaminated gas to be cleaned, represented by dark arrows, enters through the contaminated gas inlet 6 leading into the centrally-located space 31 enclosed by the louvered walls 1 of panels 30. From this space or chamber, the gas flows radially outwardly through the louvered walls 1, the beds of granular material 5 and the gas pervious walls 2 into a chamber 7a, 7b, 7c, etc. outside the wall 2 and preferably inside the housing 3. Portions 29 separate the chambers 7a, 7b, etc. so that valves 8a, 8b, 8c, etc. associated respectively with each chamber may separately control the flow of gas through each filter panel. While passing through the granular bed 5, a very high percentage of the dust or solids entrained in the gas is deposited on the surfaces of the granular material in the filter bed.

The path of the gas is shown more clearly in FIG. II. As shown, the contaminated gas enters through the inlet 6 which leads directly to the inner chamber 31 shown as surrounded by a plurality of filter panels or cells 30 and an open panel serving as an entrance from the inlet 6. After passing through walls 1 and 2, chambers 7, and valves 8, the cleaned gas travels through a clean air outlet 9.

As the dust collects on the granules in one of the filter beds, the pressure drop through the bed increases and eventually the granular material must be dedusted, i.e., the dust removed from the granules. When, for example, bed 30a is to be dedusted, valve 8a is closed to interrupt the flow of gas through that bed, the associated gate 4a is opened sufficiently to allow the granular material 5 to drain down onto a deduster unit 35 located below housing 3. In accordance with less preferred embodiments of the present invention, the dedusting unit may comprise any conventional deduster, such as a vibrating screen-type unit. However, in the preferred embodiment of the invention, the dedusting unit is based upon the principle of a plurality of surfaces which are sufficiently hard that the granular filter media bounces when impacted thereon under the force of gravity, whereas the dust will not bounce. The surfaces are inclined with respect to the vertical and are spaced from one another both vertically and horizontally in such a way that the granular filter media will cascade downwardly from surface to surface whereas the dust will fall into the horizontal spaces between the surfaces. Preferably, the surfaces are formed of metal plates.

The dedusting unit is preferably comprised of a series of shallow funnels or inverted, truncated conical decks 10 enclosed in an inverted conical housing 11. The housing 11, which serves also as a receiver for dust and other particulate material leaving the inclined surfaces at relatively slow speed, is connected through a flexible seal 12 to the lower end of the first housing 3. A second flexible seal 13 connects the bottom of the inverted conical housing 11 to a dust disposal system. The flexible seals allow vibration of the deduster while maintaining a closed system. It will, of course, be understood that the decks 10 may have any other suitable shape, such as linear, polygonal, etc.

As the granular material 5 flows down through the gate 4a it falls onto the upper marginal area of the first of the series of funnels or inverted, truncated conical decks 10. The inner surface of the decks 10 form inclined surfaces down which the material cascades. The discharge opening of each of the decks 10 does not extend to the entrance of the next lower deck to leave, in plan, an annular area or gap 32 between the lower edge of one deck and the upper edge of the next lower deck (FIG. III). The decks are spaced vertically so that granular material may cascade across the gap. The abrupt change in direction and impact as the granules impinge on the inclined surface knocks the dust 14 loose from the granules. The dust 14 slides down the inclined surface, and drops from the lower edge of the inclined surface through the gap 32 missing the rim of the next lower deck 10. Any number of decks, e.g., 2, 3, 4, 5, 6 or more, may be employed. After the first 2 or 3 decks, most of the dust has been removed, and the use of more than 5 or 6 decks does not produce significantly better dedusting. The movement of the dust down the inclined surfaces of the decks 10 and conical housing 11 may be promoted by vibration produced by one or more vibrators 15.

The angle of inclination of the decks 10 may be chosen at any value which provides sufficient momentum to the dust particles so that they will not build up on the deck surfaces and interfer with the bouncing action of the granular filter media. Otherwise, the angle of deck inclination can be chosen to coordinate with deck spacing to provide for proper cascade action of the granules, taking into consideration the amount of space available for the unit.

The cascading granules gain sufficient velocity in the direction of the inclined surface to cross the gaps between decks and land on the inclined surface of the next lower deck. After cascading down the inclined surfaces of the decks 10, the granular material flows into a collection chute 16 and through the chute to the foot of a bucket elevator 17. After being elevated in the bucket elevator 17, the granular material flows through a chute 18 to a storage hopper 19 formed in the upper part of the housing 3. From the hopper 19, the cleaned granules may be fed into any of the filter panels 30 by opening a valve 20a, 20b, 20c, etc. associated with the respective filter panels 30. Preferably, the hopper 19 has sufficient volume to permit immediate refill of any filter panel from which all of the granular material has been drained for dedusting. Complete drainage of the filter panel prior to refill ensures drainage of all the spaces between the walls 1 and 2, including the louvers of the wall 1 and any other similar spaces where granular material may otherwise remain stagnant.

As mentioned, the dust 14 separated from the granules slides down the inclined surface of the inverted conical housing 11. The flow of dust from the housing 11 is controlled by an air lock 21 which permits withdrawal of the collected dust without admission of air into the system. The air lock 21 leads to a conveyor 22 forming part of a dust disposal system. The conveyor 22 is preferably a screw conveyor.

The granular bed filter arrangement of the invention illustrated in FIG. I is provided with a timing control unit 34 to coordinate the opening and closing of valves 4, 8 and 20 of the respective filter panels in order to cyclically subject the granular filter media in the filter panels to dedusting. Timing control unit 34 may comprise a conventional timing clock, and its structure and operation are well known to persons skilled in the art. Most typically, cycling of the filter media in the individual filter panels will be conducted on a fixed time schedule with each filter panel being held out of service for a fixed period of time until the media in the next filter panel is ready for dedusting. In this way, the number of filter panels in service (n−1) will preferably be held constant. The period chosen for the cycle will depend on the nature of the gas stream being filtered. Cycle time can also be made to depend on a measured parameter, such as pressure drop across the filter panel.

According to another preferred embodiment, the granular bed filter arrangement also includes a gas inlet pipe 33a, 33b, 33c, etc. associated with each of valves 8a, 8b, 8c, etc. for introducing a backpressure gas, preferably heated, into the filter panel during the period when it is out of service for emptying the granular media for dedusting and refilling. The pressure of the gas, which is preferably air, introduced via inlet pipe 33a must be slightly higher than the pressure prevailing in inner chamber 31, so that dust from the filter panel or from the contaminated feed gas is kept out of chamber 7a, from which it could escape into the clean gas stream when filter panel 30a is put back into service by opening valve 8a.

It may be desirable for certain types of waste gases to subject the contaminated gas stream to a prefiltration treatment stage (not illustrated), such as a cyclone or the like, in order to remove large size particulate material. It is to be noted, however, that a certain degree of such pretreatment is accomplished in the device according to the invention when the gas is introduced through inlet 6 into the inner chamber 31. Some large size particles will settle out in this chamber.

In this arrangement shown in FIG. IV, the granule flow from valve 4a down the decks 10 occurs largely in the area below the filter panel being drained. Thus, much of the surface of each deck is effectively unutilized. More efficient use of the inclined deck surfaces may be made by including a distributing channel or trough 23 (FIG. V) around the top of the inverted conical housing 11. The trough 23 is formed with metering slots 24 to control the flow of granular material from the trough onto the top deck 10. Preferably, the granular material is conveyed around the trough 23 by a helical vibration of the housing 11. In the illustrated embodiment, the trough 23 has sufficient volume that it serves as a surge hopper to receive the entire contents of a filter panel 30a when its gate 4a is opened. This feature along with the overhead hopper 19 minimizes the down time of a filter panel as it is emptied and then refilled. Of course, other means such as a mechanical conveyor (e.g., an auger conveyor or a chain conveyor) could be used to circumferentially distribute the granular filter media around the distributing trough 23.

The granular material is conveyed around the trough to provide a more or less uniform flow throughout the circumference of the trough and onto the uppermost deck 10. Preferably, the trough is given a helical vibratory motion to keep the material moving around the trough as it is metered out onto the decks 10. As shown, the housing 11, including the decks 10, is mounted on a vibratory base 25 which is supported on coil spring insolators 26. A pair of motors 27, each equipped with eccentric weights (not shown), are mounted in the vibratory base. The motors are spaced equidistantly from the vertical axis of the base 25 and housing 11 with their axes of rotation inclined from the vertical. The interaction of the eccentric weights synchronizes the motor speeds. This arrangement provides a helical vibration to the housing 11 to convey the granular material in the trough 23, while simultaneously agitating the material to knock some of the collected dust from the granules. At the same time, the dust collected in the bottom of the housing 11 is conveyed by this motion to a collection chute leading to the air lock 21. Of course, other types of vibrators, such as electromagnetic or eccentric shaft drive types, can be used instead.

During operation of the granular bed filter arrangement of the invention, the granule size of the filter media and the thickness of the filter bed may be selected over a wide range. These parameters are dictated by the nature of the waste gas to be filtered and the maintenance of an acceptable pressure drop across the filter bed. Typically, a pressure drop of from about 2–12 and preferably from about 6–10 inches of water represents an optimum pressure drop from an energy efficiency standpoint. Gas flow rates typically range between about 50 and 200 feet per minute. The device of the invention is adapted to use a wide variety of granule size filter media, used either as uniform or mixed sizes.

For example, the following combinations of parameters can provide an effluent level under 0.04 gr/sdcf when used to filter the waste gases from a zinc oxide retort containing particulate of 96% finer than $1.5\mu$ in size.

| Bed Thickness (in.) | Bed Media |
|---|---|
| 3½ | 10–14 mesh quartz |
| 3½ | 20–30 mesh quartz |
| 2 | 20–30 mesh quartz |
| 2 | 10–14 mesh quartz |
| 2 | 8–10 mesh quartz |
| 2 | 50% 8–10 mesh quartz 50% 10–14 mesh quartz |

It is to be understood that the foregoing detailed description and the figures of drawing pertain merely to several preferred and illustrative embodiments of the present invention which are not intended to in any way limit the scope of the present invention. The scope of the invention is to be measured by the appended claims.

In summary, the disclosed system provides an efficient granular bed filter system in which the granular material in the filter bed is held quiescent for optimum filtering and is quickly replaced, thus achieving a minimum down time for the filter panel when cleaning or dedusting is required, in which the granular material is dedusted and separated from the dust by a centralized dedusting unit serving a plurality of filter panels, preferably by the action of the granular filter media cascading down (by gravitational forces) a plurality of spaced inclined surfaces across one or more gaps, and in which the entire system is practically immune to wear or high temperatures. Separation of granular material by its action on the inclined surfaces relies upon the nature of the granules and their bouncing action as contrasted to the soft cushiony action of the dust, thus making the separation nearly independent of granule size. This allows the use of a wide range of granule sizes in the filter system to accommodate different types of dust and contaminated gas streams.

What is claimed is:

1. A device for removing particulate material entrained in a gaseous stream, comprising:
    a generally gas-tight containment vessel;
    a gas inlet for introducing the particulate material-containing gaseous stream into the central portion of said vessel;
    a plurality of generally vertically oriented filter panels arranged circumferentially about the central portion of said vessel, said filter panels comprising two generally parallel gas-permeable confining members for confining therebetween a bed of granular material as a filter media;
    wall members defining separate chambers containing each of said filter panels and isolating the radially outer side of each filter panel from the radially outer side of each of the other filter panels;
    a separate clean gas outlet in each of said chambers associated with each of said filter panels, thereby defining a plurality of independent gas flow paths from the central portion of said vessel through each of said respective filter panels to the clean gas outlet associated with each of said filter panels, whereby particulate material contained in the gas flowing through each filter panel will become trapped in granular filter media to be contained in the filter panel;

means for selectively closing each of said clean gas outlets to temporarily decrease the number of independent gas flow paths;

means located in the upper portion of said vessel for selectively supplying granular filter media to each of said filter panels;

means for selectively emptying each of said filter panels of granular filter media to be contained therein;

means, centrally positioned beneath said vessel, for separating trapped particulate material from granular filter media to be emptied from said filter panels, said separating means cooperating with each of said filter panels to receive granular filter media to be selectively emptied therefrom; and means for conveying separated granular filter media from said separating means to said supplying means in the upper portion of said vessel, wherein said separating means comprises (a) a plurality of surfaces positioned below the discharge point of said means for emptying each of said filter panels of granular filter media, said surfaces being sufficiently hard that the granular filter media will bounce upon impact with said surfaces due to the force of gravity, said surfaces being inclined with respect to the vertical and being spaced from one another vertically in such a way that the surface impacted by the granular filter media is located uppermost and each subsequent surface is located at a progressively lower position to form a cascade of said surfaces, and said surfaces also being spaced from one another horizontally in such a way that granular filter media discharged thereon will cascade downwardly by bouncing from surface to surface whereas particulate material accompanying the granular filter media will fall into the horizontal spaces between said surfaces, (b) means associated with said conveying means for collecting granular filter media, at the bottom of said cascade of said plurality of surfaces, and (c) means, positioned beneath the horizontal spaces between each pair of said surfaces positioned adjacently to one another, for receiving particulate material falling into the horizontal spaces between said surfaces, whereby the particulate material is separated from the granular filter media.

2. A device as defined by claim 1, wherein said granular filter media supplying means comprises a common supply hopper for granular filter media and a normally-closed and selectively openable valve between said supply hopper and each of said filter panels.

3. A device as defined by claim 1, wherein said means for selectively emptying each of said filter panels comprises a normally-closed and selectively openable valve positioned at the bottom end of each of said filter panels.

4. A device as defined by claim 1, further comprising means for collecting clean gas exiting from each of said clean gas outlets and discharging the collected clean gas from a common gas outlet associated with said vessel.

5. A device as defined by claim 1, wherein each of said means for selectively closing each of said clean gas outlets comprises a normally open and selectively closable valve positioned in each of said clean gas outlets.

6. A device as defined by claim 1, further comprising control means for periodically closing one of said clean gas outlets, for subsequently actuating said means for emptying the filter panel with which said closed clean gas outlet is associated, and for subsequently actuating the granular filter media supplying means to refill the emptied filter panel after it has been completely emptied.

7. A device as defined by claim 1, wherein said vessel comprises a generally cylindrical configuration, said gas inlet comprises a conduit entering said vessel at one side thereof, said plurality of filter panels comprises from about 6 to 8 vertically oriented, generally rectangular panels positioned circumferentially around the interior of said vessel on each side of said gas inlet conduit and said separating means comprises an inverted-conical unit positioned substantially coaxially below said vessel.

8. A device as defined by claim 1, wherein the inner one of said confining members comprises a plurality of upwardly-directed louvers.

9. A device as defined by claim 8, wherein the outer one of said confining members comprises a porous screen member.

10. A device as defined by claim 1, wherein said conveying means comprises a collection conduit for collecting granular filter media from said separating means, a generally vertically oriented conveyor connected to said collection conduit and a discharge conduit connected to the top of said conveyor for discharging granular filter media from the conveyor into said supplying means.

11. A device as defined by claim 10, wherein said conveyor comprises a bucket elevator.

12. A device as defined by claim 1, further comprising means for conveying said separated particulate material away from said separating means.

13. A device as defined by claim 12, further comprising a gas lock between said separating means and said means for conveying separated particulate material from said separating means.

14. A device as defined by claim 13, wherein said means for conveying separated particulate material comprises a screw conveyor.

15. A device as defined by claim 1, wherein the horizontal spacing is greater between pairs of said surfaces near the bottom than between pairs of said surfaces near the top.

16. A device as defined by claim 1, wherein said surfaces comprises a plurality of metal plates.

17. A device as defined by claim 16, wherein said metal plates comprise substantially concentrically arranged, inverted truncated conical plates.

18. A device as defined by claim 17, wherein said separating means further comprises an inverted-conical housing member surrounding said plates and being substantially of the same diameter as said vessel and being substantially coaxial with said vessel.

19. A device as defined by claim 17, wherein said separating means further comprises means for vibrating said plurality of surfaces.

20. A device as defined by claim 19, wherein said vibrating means comprises a vibrator attached to said housing member and vibration-isolating mounts on said housing member.

21. A device as defined by claim 20, further comprising flexible, gas-tight sealing means between said housing member and said vessel.

22. A device as defined by claim 17, wherein said separating means further comprises means for circumferentially distributing granular filter media discharged from one of said filter panels around the periphery of said plates, whereby the entire surface area of said plates can be employed for separating the particulate material from the granular filter media discharged from each of said filter panels.

23. A device as defined by claim 22, wherein said circumferential distributing means comprises means for imparting circulatory vibrations to said separating means.

24. A device as defined by claim 23, further comprising a distributing channel located in said separating means above said plates, said distributing channel extending around the circumference of said separating means to facilitate distribution of granular filter media.

25. A device for removing particulate material entrained in a gaseous stream, comprising:
- a vessel having an inlet for particulate material-contaminated gas and an outlet for clean gas;
- at least one filter bed positioned in said vessel between said inlet and said outlet to define a gas flow path from said inlet through said filter bed to said outlet, said filter bed comprising a bed of granular filter media and two gas-permeable means for confining the granular filter media;
- means, associated with said vessel, for selectively closing off said contaminated gas inlet;
- means for removing the granular filter media from said filter bed;
- means associated with said vessel for separating particulate material filtered from the gaseous stream from the granular filter media removed from said filter bed, said separating means comprising (a) a plurality of surfaces positioned below the discharge point of said means for removing the granular filter media from said filter bed, said surfaces being sufficiently hard that the granular filter media will bounce upon impact with said surfaces due to the force of gravity, said surfaces being inclined with respect to the vertical and being spaced from one another vertically in such a way that the surface first impacted by the granular filter media is located uppermost and each subsequent surface is located at a progressively lower position to form a cascade of said surfaces, and said surfaces also being spaced from one another horizontally in such a way that granular filter media discharged thereon will cascade downwardly by bouncing from surface to surface whereas particulate material accompanying the granular filter media will fall into the horizontal spaces between said surfaces, (b) means for collecting granular filter media at the bottom of said cascade of said plurality of surfaces, and (c) means, positioned beneath the horizontal spaces between each pair of said surfaces positioned adjacent to one another for receiving particulate material falling into the horizontal spaces between said surfaces, whereby the particulate material is separated from the granular filter media; and
- means, connected between said vessel and said separating means, for refilling said filter bed with filter media collected by said collecting means.

26. A device as defined by claim 25, wherein the horizontal spacing is greater between pairs of said surfaces near the bottom than between pairs of said surfaces near the top.

27. A device as defined by claim 25, wherein said surfaces comprise a plurality of metal plates.

28. A device as defined by claim 27, wherein said metal plates comprise substantially concentrically arranged, inverted truncated conical plates.

29. A device as defined by claim 28, wherein said separating means further comprises an inverted-conical housing member surrounding said plates and being substantially of the same diameter as said vessel and being substantially coaxial with said vessel.

30. A device as defined by claim 28, wherein said separating means further comprises means for vibrating said plurality of surfaces.

31. A device as defined by claim 30, wherein said vibrating means comprises a vibrator attached to said housing member and vibration-isolating mounts on said housing member.

32. A process for removing particulate material entrained in a gaseous stream, comprising the steps of:
- conveying a particulate material-contaminated gas through at least a first filter bed of granular filter media, whereby the particulate material becomes trapped in the granular filter media;
- removing the granular filter media containing trapped particulate material from the filter bed;
- separating trapped particulate material from the granular filter media removed from the filter bed, said separating step comprising cascading the granular filter media down a plurality of surfaces, said surfaces being sufficiently hard that the granular filter media will bounce upon impact with said surfaces due to the force of gravity, said surfaces being inclined with respect to the vertical and being spaced from one another vertically in such a way that the surface first impacted by the granular filter media is located uppermost and each subsequent surface is located at a progressively lower position and said surfaces also being spaced from one another horizontally in such a way that granular filter media discharged thereon will cascade downwardly by bouncing from surface to surface whereas particulate material accompanying the granular filter media will fall into the horizontal spaces between said surfaces;
- collecting the separated granular filter media at the bottom of the plurality of surfaces;
- returning the collected granular filter media to the filter bed; and
- collecting the particulate material separated from the granular filter media.

33. A process as defined by claim 32, further comprising the step of collecting the separated particulate material and conveying it away.

34. A process as defined by claim 32, further comprising the step of vibrating the plurality of surfaces during said separating step.

35. A process as defined by claim 32, comprising the steps of interrupting the flow of gas through the filter bed, completely emptying the granular filter media from the filter bed, subjecting the emptied filter media to said separation step, returning the separated filter media to the filter bed and reestablishing the flow of gas through the filter bed.

36. A process as defined by claim 32, comprising the steps of conveying the contaminated gas through at least one second filter bed of granular filter media, interrupting the flow of gas through the first filter bed, emptying the granular filter media from the first filter bed, subjecting the emptied filter media to said separation step, returning the separated filter media to the first filter bed, reestablishing the flow of gas through the first filter bed; after said flow reestablishment step, interrupting the flow of gas through said second filter bed, emptying the granular filter media from the second filter bed, subjecting the emptied filter media to said separation step, returning the separated filter media to the second filter bed and reestablishing the flow of gas through the second filter bed.

37. A process as defined by claim 36, wherein said separation step is conducted in a common separation unit comprised of said plurality of surfaces.

38. A process as defined by claim 32 or claim 37, wherein each of said plurality of surfaces comprises the shape of an inverted truncated cone, and wherein said process further comprises the step of distributing the granular filter media removed from the filter bed around substantially the entire circumference of the conical shaped surfaces.

* * * * *